(12) United States Patent
Mahmoud (10) Patent No.: US 7,007,158 B1
(45) Date of Patent: Feb. 28, 2006

(54) METHOD FOR PROVIDING A CONFIGURATION EXTENSIBLE MARKUP LANGUAGE (XML) PAGE TO A USER FOR CONFIGURING AN XML BASED STORAGE HANDLING CONTROLLER

(75) Inventor: Fadi A. Mahmoud, Livermore, CA (US)

(73) Assignee: Adaptec, Inc., Milpitas, CA (US)

(*) Notice: Subject to any disclaimer, the term of this patent is extended or adjusted under 35 U.S.C. 154(b) by 633 days.

(21) Appl. No.: 10/077,466

(22) Filed: Feb. 14, 2002

(51) Int. Cl.
G06F 15/177 (2006.01)
G06F 9/00 (2006.01)
G06F 11/00 (2006.01)

(52) U.S. Cl. .............................. 713/1; 713/100; 714/46
(58) Field of Classification Search ............... 713/1, 713/2, 100; 715/501.1; 709/219; 714/26, 714/46
See application file for complete search history.

(56) References Cited

U.S. PATENT DOCUMENTS

| | | | |
|---|---|---|---|
| 5,884,073 A * | 3/1999 | Dent .............................. | 713/2 |
| 6,393,466 B1 * | 5/2002 | Hickman et al. ........... | 709/214 |
| 6,449,624 B1 * | 9/2002 | Hammack et al. .......... | 707/203 |
| 6,470,384 B1 * | 10/2002 | O'Brien et al. ............. | 709/223 |
| 6,560,641 B1 * | 5/2003 | Powderly et al. ........... | 709/219 |
| 6,795,854 B1 * | 9/2004 | Parker et al. ............... | 709/223 |
| 6,807,631 B1 * | 10/2004 | Fuller et al. ................ | 713/100 |

FOREIGN PATENT DOCUMENTS

| GB | 2393543 A | * | 3/2004 |
|---|---|---|---|
| WO | WO 9728499 A1 | * | 8/1997 |

OTHER PUBLICATIONS

William Wong, Java 2, Dec. 3, 2001, Electronic Design, ED Online ID #3499, pp. 4.*

* cited by examiner

Primary Examiner—Thomas Lee
Assistant Examiner—Suresh K Suryawanshi
(74) Attorney, Agent, or Firm—Martine Penilla and Gencarella LLP (57) ABSTRACT

An Extensible Markup Language (XML) based storage handling controller for a storage medium is provided. The XML based storage handling controller includes storage handling firmware that is in communication with a storage medium. The storage handling firmware is capable of receiving and generating XML based data, which is utilized for configuring the storage handling firmware. In addition, a basic input out input output system (BIOS) is included that is in communication with the storage handling firmware. The BIOS includes a browser capable of presenting XML based data. The browser can provide a graphical user interface (GUI) that can be used to provide configuration commands to the storage handling firmware.

18 Claims, 8 Drawing Sheets

METHOD FOR PROVIDING A CONFIGURATION EXTENSIBLE MARKUP LANGUAGE (XML) PAGE TO A USER FOR CONFIGURING AN XML BASED STORAGE HANDLING CONTROLLER

CROSS REFERENCE TO RELATED APPLICATIONS

This application is related to U.S. patent application Ser. No. 10/077,394, filed Feb. 14, 2002, and entitled "XML Based Storage Area Network," which is incorporated by reference herein in its entirety.

BACKGROUND OF THE INVENTION

1. Field of the Invention

The present invention relates generally to computer storage, and more particularly to host storage controller configuration via Extensible Markup Language.

2. Description of the Related Art

As computer systems have become larger, faster, and more reliable, there has been a corresponding increase in the need for storage capacity, speed, and reliability of the storage devices. Although increases in the data storage capacity and reliability of storage devices have been dramatic in recent years, there remain certain limitations to what can be accomplished. In response, alternative configurations of storage devices have increasingly been offered in recent years to meet demand for larger capacity, faster, more reliable, and more accessible data storage.

One example of the alternative configurations is the redundant array of independent disks (RAID), which is a disk subsystem that increases performance and provides fault tolerance. A RAID is a set of two or more hard disks and a specialized disk controller that contains the RAID functionality. In operation, a RAID improves performance via disk striping, which interleaves bytes or groups of bytes across multiple drives, resulting in multiple disks reading and writing simultaneously.

In addition, mirroring and parity is used to achieve fault tolerance. Mirroring duplicates 100% of the data on two drives. Parity calculates the data in two drives and stores the result on a third drive. Essentially, a bit from drive 1 is XOR'd with a bit from drive 2, and the result bit is stored on drive 3. In this manner, a failed drive can be hot swapped with a new one, and the RAID controller can automatically rebuild the lost data.

Often, multiple computer systems are configured to share multiple storage devices. Thus, configurations of storage devices can be use as a storage area network (SAN). A SAN is a configuration of multiple data storage devices, connected to one or more host computer systems, such that there is a communication path from each storage device to each host system which does not cross the system bus of another host system. Because there exists a direct communication path from each system to each storage device, data on any device is readily accessible to any of the systems. Storage devices in a SAN are not necessarily identified with or controlled by a host. This latter feature distinguishes a SAN from a simple network of computer systems, each having its own local storage devices. Thus, in certain computing environments, a SAN facilitates sharing of data and improved performance over a conventional network of host systems.

Unfortunately, the requirements to configure such a system place substantial demands on the expertise of the user. A user must determine how to operate, configure and attach devices. Optimum physical configurations may depend on logical configurations and modes of operation, such as one or more RAID levels. There may be numerous hardware dependencies and limitations, such as number and type of devices that may communicate with a single I/O controller or adapter. Hence, it is desirable to support the construction of storage networks with software that assists the user.

Currently, storage handling controller configuration is performed using proprietary data structures. Hence, standard configuration interfaces cannot be used. Although, some manufactures have tried to use Hyper Text Markup Language (HTML) as a method to transmit data to remote and local storage handling controllers for configuration, HTML lacks flexibility and speed.

In view of the foregoing, there is a need for a SAN configuration method that supports the construction of SANs with software that assists the user. The method should utilize a flexible and fast manner of communicating with users, and preferably should enhance usability by using a graphical user interface to facilitate configuration.

SUMMARY OF THE INVENTION

Broadly speaking, the present invention fills these needs by providing a storage handling controller capable of using Extensible Markup Language (XML) for configuration operations. In one embodiment, an XML based storage handling controller for a storage medium is disclosed. The XML based storage handling controller includes storage handling firmware that is in communication with a storage medium. The storage handling firmware is capable of receiving and generating XML based data, which is utilized for configuring the storage handling firmware. In addition, a basic input output system (BIOS) is included that is in communication with the storage handling firmware. The BIOS includes a browser capable of presenting XML based data. The browser can provide a graphical user interface (GUI) that can be used to provide configuration commands to the storage handling firmware. In addition, a compact Java Virtual Machine (JVM) can be included that interfaces with the storage handling firmware using the XML based data.

A method for providing a configuration XML page to a user for configuring a XML based storage handling controller is disclosed in a further embodiment of the present invention. A XML based data structure is generated using firmware for a storage handling controller. The XML based data structure is then provided to the BIOS of the storage handling controller. The BIOS creates a XML page based on the XML based data structure, and the XML page is displayed using a browser, which can be an embedded browser included in the BIOS. As above, the embedded browser can provide a GUI that can be used to provide configuration commands to the storage handling firmware.

In a further embodiment, a method for initializing a multi-controller system having XML based storage handling controllers is disclosed. A multi-controller system is polled to determine what storage handling controllers are present, and a XML page is generated based on a result of the polling. A user selection of a storage handling controller is then received via the XML page, and XML based data is the received from the selected storage handling controller. Embedded controller search software included in the BIOS of a storage handling controller can be used to poll the multi-controller system. Further, the result of polling can include responses from the storage handling controller present in the multi-controller system that include information regarding the storage handling controllers. The XML page can then include the information regarding the storage handling controllers of the system.

Advantageously, using the embodiments of the present invention, a configuration GUI can be presented to the user for easier configuration of the storage handling controller without the need of creating hardware specific graphic libraries to generate a proprietary GUI for the user. In addition, the embodiments of the present invention can also be used to configure multiple storage handling controllers. Since the firmware of the present invention advantageously generates XML data directly, any browser capable of processing XML data can be used to communicate with the firmware.

Further, network users are currently beginning to use XML in much greater numbers than previously because of the greater flexibility and speed provided by XML. The popularity of XML has also caused an increase in the number of application programs utilizing XML, and this, in turn, has increased the number of users educated in XML. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a storage handling controller capable of using Extensible Markup Language (XML) for configuration operations. To this end, the present invention provides an XML based storage handling controller that is capable of receiving and generating XML data directly. A user can then view the XML data as an XML page using an XML capable browser. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
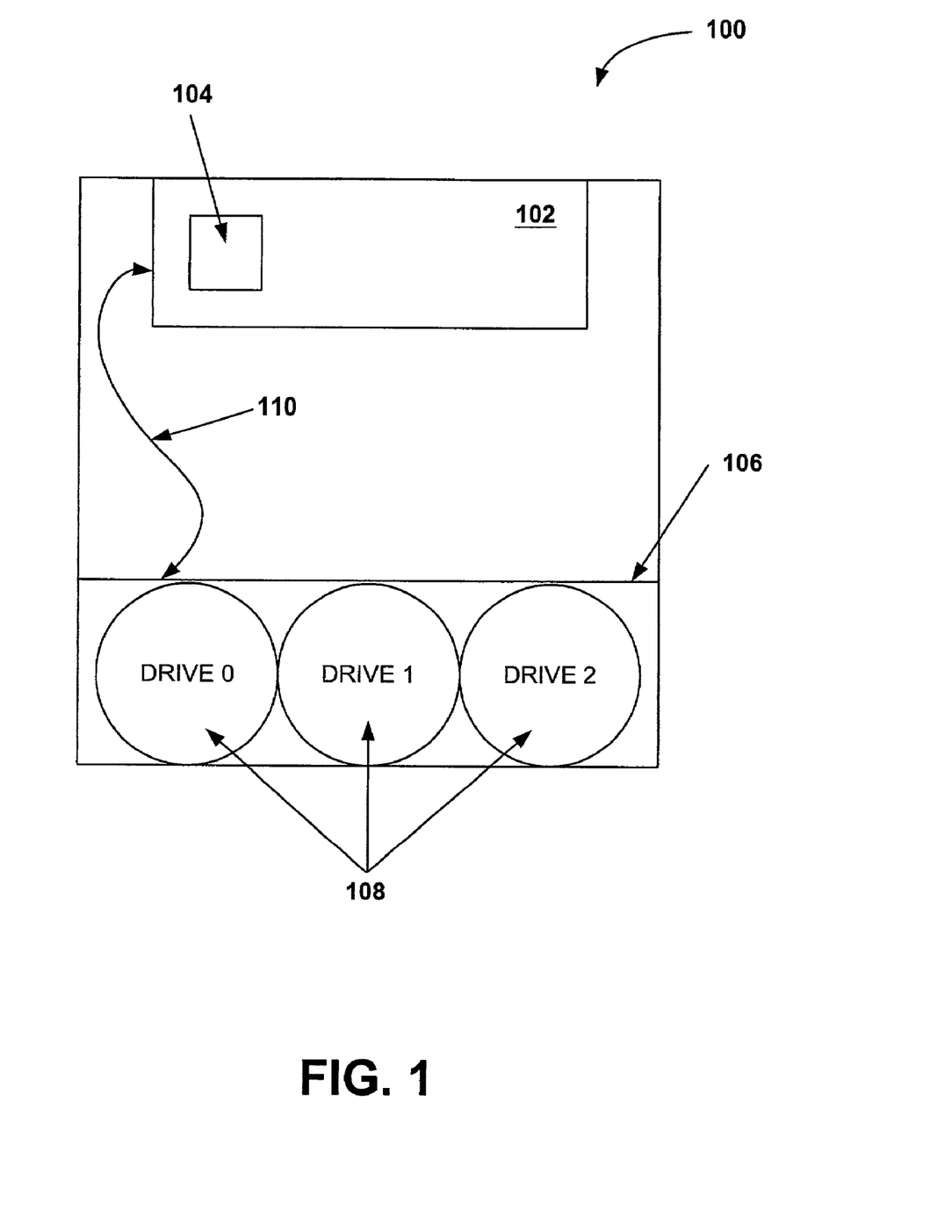
FIG. 1 is a diagram showing a RAID system having a XML based storage handling controller, in accordance with an embodiment of the present invention.

FIG. 1 is a diagram showing a RAID system 100 having a XML based storage handling controller, in accordance with an embodiment of the present invention. The RAID storage system 100 includes a RAID card 102 having a XML based storage handling controller 104 coupled to a RAID drive 106 via controller cable 110. Included in the RAID drive 106 is a plurality of independent disks 108. The XML based storage handling controller 104 provides the functionality for the RAID drive 106, and improves performance and fault tolerance by disk striping, mirroring, and parity.

As mentioned above, disk striping interleaves bytes or groups of bytes across multiple drives, such that multiple disks read and write simultaneously. Mirroring duplicates 100% of the data on two drives, and parity calculates the data in two drives and stores the result on a third drive. Although, the storage-handling controller 104 has been described in terms of a RAID system, it should be noted that the embodiments of the present invention can be used for other storage handling based task, as will be apparent to those skilled in the art.

To configure the RAID system 100, the XML based storage handling controller 104 includes an option basic input output system (BIOS) that provides a graphical user interface (GUI) for use in RAID configuration. As stated above, a user must determine how to operate, configure and attach devices. Optimum physical configurations may depend on logical configurations and modes of operation, such as one or more RAID levels. There may be numerous hardware dependencies and limitations, such as number and type of devices that may communicate with a single I/O controller or adapter. Hence, the XML based storage handling controller 104 provides a GUI for use in RAID configuration, which greatly enhances the user's ability to configure the RAID system 100.

Figure 2:
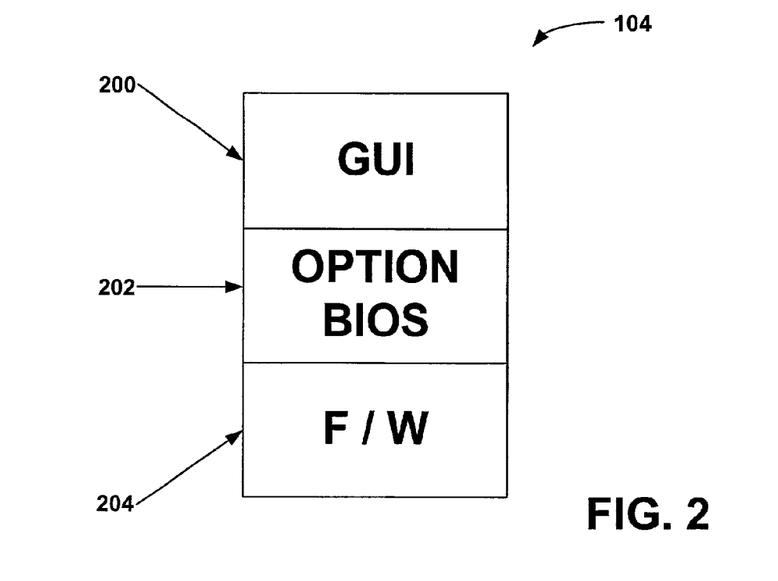
FIG. 2 is a block diagram showing a XML based storage handling controller, in accordance with an embodiment of the present invention.

FIG. 2 is a block diagram showing a XML based storage handling controller 104, in accordance with an embodiment of the present invention. The XML based storage handling controller 104 includes a GUI 200, an option BIOS 202, and firmware 204. As will be discussed in greater detail subsequently, the embodiments of the present invention utilize XML to configure the storage handling controller 104. More particularly, unlike conventional controller firmware, which utilizes proprietary data structures for configuration operations, the firmware 204 of the storage handling controller 104 of the embodiments of the present invention is capable of both receiving and generating XML data.

The option BIOS 202 includes an essential set of configuration routines for the storage handling controller 104. The configuration routines are stored on the firmware 204 and provide an interface between the operating system and the firmware 204. In addition, the option BIOS 202 of the embodiments of the present invention includes a browser capable of processing XML data.

XML is an open standard for describing data, such as defining data elements on a Web page. XML uses a similar tag structure as HTML, however, whereas HTML defines how elements are displayed, XML defines what those elements contain. In addition, HTML uses predefined tags, while XML allows tags to be defined by the developer of the page. Thus, virtually any data items, such as status, backup, and RAID configuration data, can be identified, allowing Web pages to function like database records. By providing a common method for identifying data, XML can support configuration transactions and is expected to become the dominant format for electronic data interchange.

Further, the human-readable XML tags provide a simple data format. XML tags are defined in an XML schema, which defines content type as well as name. XML is a subset of Standard Generalized Markup Language (SGML), which is an International Organization for Standardization (ISO) standard for defining the format in a text document. As such, XML tags can be described in the original SGML document type definition format. Moreover, unlike HTML, which uses a loose coding style and which is tolerant of coding errors, XML pages must be "well formed," which means they must comply with rigid rules. As a result, proper coding is enforced using XML.

The browser in the BIOS 202 reads the XML data generated by the firmware 204, to produce the GUI 200 for the user, similar to the manner in which a web page from the Internet is displayed graphically to the user. Since the firmware 204 advantageously generates XML data directly, any browser capable of processing XML data can be used to communicate with the firmware 204, as will described in greater detail subsequently. Preferably, the embedded browser in the BIOS 202 is reduced in size to more easily fit within the firmware 204.

Figure 3:
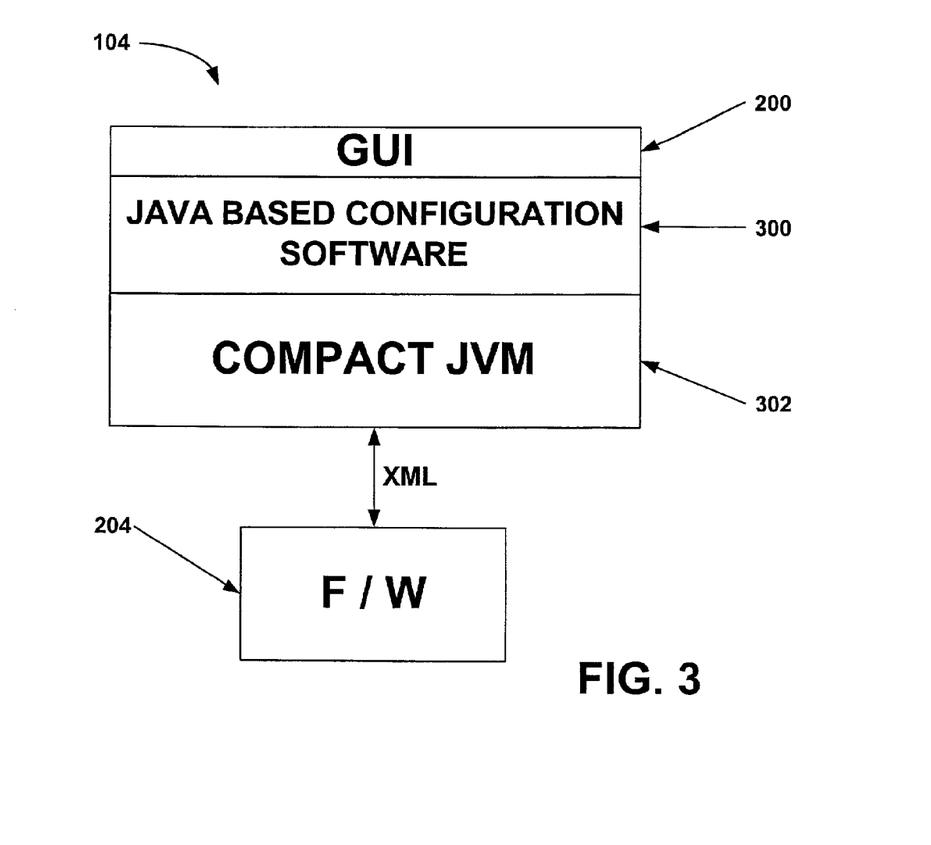
FIG. 3 is a block diagram showing a XML based storage handling controller having a compact Java virtual machine, in accordance with an embodiment of the present invention.

FIG. 3 is a block diagram showing a XML based storage handling controller 104 having a compact Java virtual machine (JVM), in accordance with an embodiment of the present invention. As shown in FIG. 3, the storage handling controller 104 includes Java based configuration software 300 executing on a compact JVM 302, which interfaces with the firmware 204 using XML.

The compact JVM 302 is used as an interpreter for the configuration software 300. Unlike most programming languages, in which a program is compiled into machine-dependent, executable program code, Java classes are compiled into machine independent byte-code class files, which are executed by a machine-dependent JVM 302. The JVM 302 provides a level of abstraction between the machine independence of the byte-code classes and the machine-dependent instruction set of the underlying firmware 302. A class loader is responsible for loading the byte-code class files as needed, and an interpreter or just-in-time compiler provides for the transformation of byte-codes into machine code.

The Java based configuration software 300 is used to configure the firmware 204 using XML code. As explained previously, the firmware 204 of the embodiments of the present invention is capable generating and receiving XML data directly, without the need of proprietary data structures. Hence, in operation, the user can use the embedded browser GUI 200 to interface with the Java based configuration software 300, which then communicates with the firmware 204 using XML via the compact JVM 302. Moreover, the GUI 200 can be presented to the user for easier configuration using a XML capable browser, thus avoiding the need for generating a proprietary GUI using hardware specific graphic libraries.

Figure 4:
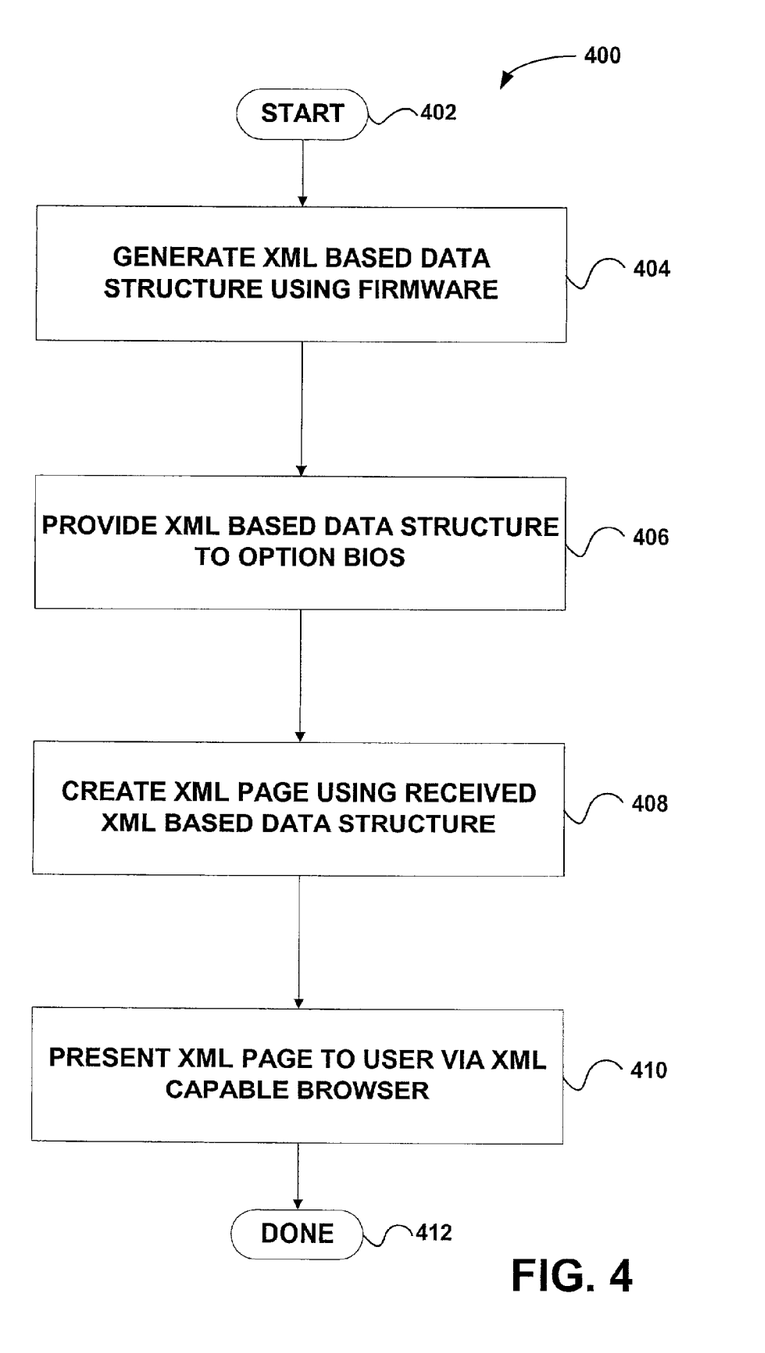
FIG. 4 is a flowchart showing a method for providing a configuration XML page to a user using a XML based storage handling controller, in accordance with an embodiment of the present invention.

FIG. 4 is a flowchart showing a method 400 for providing a configuration XML page to a user using a XML based storage handling controller, in accordance with an embodiment of the present invention. In an initial operation 402, preprocess operations are performed. Preprocess operations include provisioning the hardware of the storage system and other preprocess operations that will be apparent to those skilled in the art.

In operation 404, a XML based data structure is generated using the firmware of the storage handling controller. The firmware of the embodiments of the present invention communicates using data structures that are filled in depending on the state of the firmware and any data requests that are received by the firmware. More specifically, the firmware of the present invention communicates by filling in XML data structures based on the state of the firmware and any data requests that are received by the firmware.

The XML based data structure is then provided to the option BIOS, in operation 406. Once the XML data structures are generated by the firmware, the data structures are provided to the option BIOS. As will be explained in greater detail subsequently, the XML data structures can also be provided to network software, which can encapsulate and transmit the XML data structures over a network for remote configuration.

The XML data structures are then used to create a XML page, in operation 408. In operation 408, the embedded browser in the option BIOS of the controller processes the received XML data structures and creates a XML page based on the contents of the XML data structures. Next, in operation 410, the XML page is presented to the user using the embedded browser. In this manner, the embedded browser produces a GUI for the user, similar to the manner in which a web page from the Internet is displayed graphically to the user. The GUI, generated by the embedded browser, can also be used to receive configuration commands from the user. The configuration commands are then processed into XML and provided to the firmware as XML data. The results of the command can then be presented to the user as described above. In this manner, the user can use the XML capable embedded browser to configure the storage handling controller of the embodiments of the present invention.

Post process operations are performed in operation 412. Post process operations include altering the functionality of the RAID hardware based on received XML configuration data, and other post process operations that will be apparent to those skilled in the art. Advantageously, using the embodiments of the present invention, a configuration GUI can be presented to the user for easier configuration of the storage handling controller without the need of creating hardware specific graphic libraries to generate a proprietary GUI for the user. In addition, the embodiments of the present invention can also be used to configure multiple storage handling controllers, as described next with reference to FIGS. 5A and 5B.

Figure 5A:
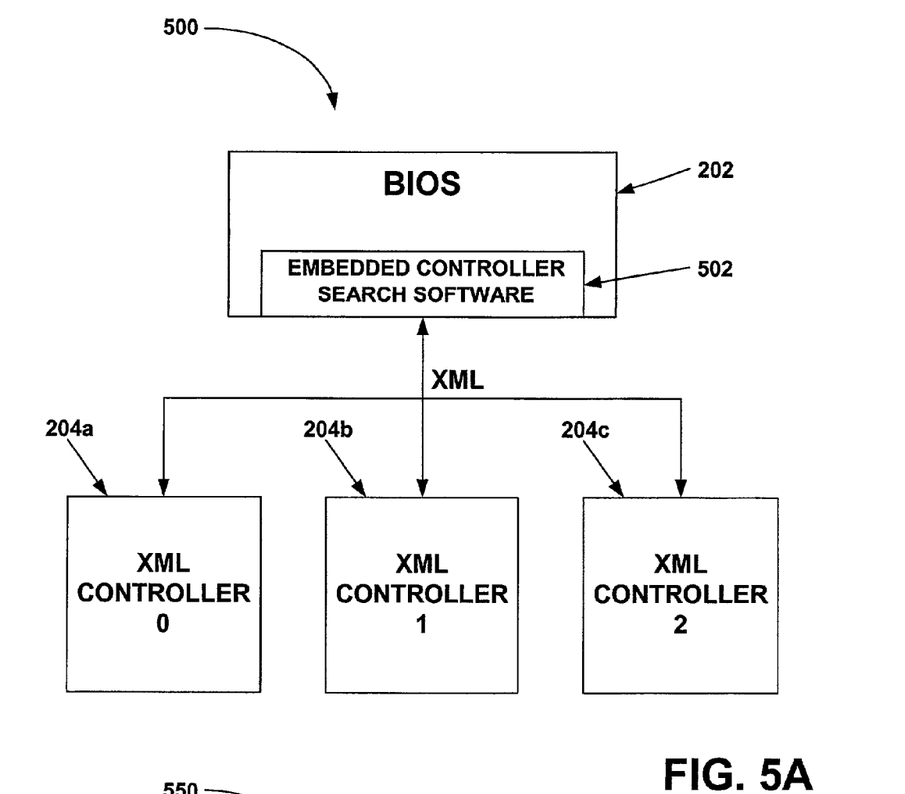
FIG. 5A is a block diagram showing a multi-controller storage system, in accordance with an embodiment of the present invention.

FIG. 5A is a block diagram showing a multi-controller storage system 500, in accordance with an embodiment of the present invention. The multi-controller storage system 500 includes an option BIOS 202 having embedded controller search software 502 in communication with storage handling controllers 204a, 204b, and 204c. Although only three storage handling controllers are shown in FIG. 5A, it should be noted that any number of storage handling controllers can be included in the multi-controller storage system of the embodiments of the present invention.

Generally, XML data is generated by the firmware of the storage handling controller and passed to the BIOS and embedded browser for display to the user. However, when initializing a multi-controller system, the user should be allowed to select a particular storage handling controller to configure. Since the individual controllers are unaware of the presence of the other controllers, a method is required to allow the system to determine which controllers are present and allow the user to select a particular controller to configure. This is performed in the embodiments of the present invention via the embedded controller search software 502 in the option BIOS 202.

Specifically, the embedded controller search software 502 polls the multi-controller system 500 to determine which storage handling controllers are present. Thus, in the example of FIG. 5A, the embedded controller search software 502 polls the multi-controller system 500. In response, each storage handling controller 204a, 204b, and 204c responds by providing information concerning the individual controller to the embedded controller search software 502 of the requesting BIOS 202. It should be noted that the BIOS 202 can be part of any of the controllers 204a–204c of the multi-controller system 500, however, generally the BIOS 202 of the first controller is used. This BIOS then executes its embedded controller search software 502 to poll the remaining controllers in the multi-controller system 500. Upon receiving responses from the storage handling controllers 204a–204c of the multi-controller system 500, the embedded controller search software 502 generates a XML page that includes the controller information for the multi-controller system 500.

Figure 5B:
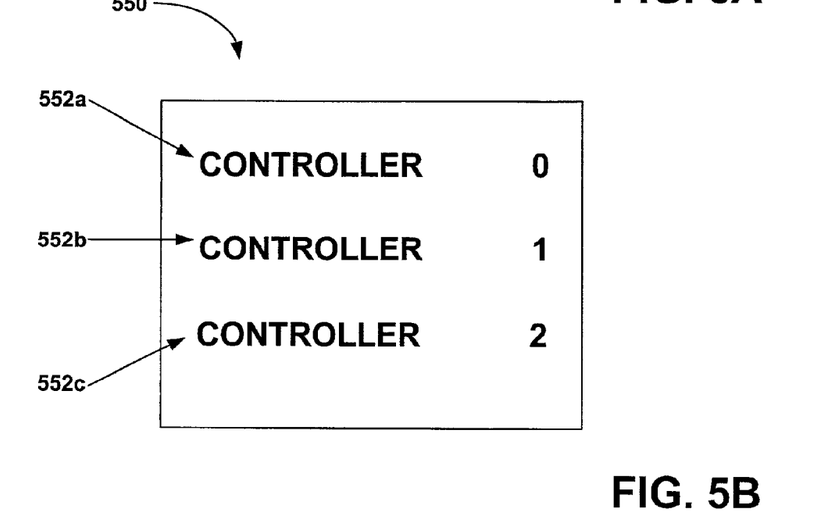
FIG. 5B is a diagram showing an exemplary XML page for a multi-controller system, in accordance with an embodiment of the present invention.

FIG. 5B is a diagram showing an exemplary XML page 550 for a multi-controller system, in accordance with an embodiment of the present invention. The exemplary XML page 550 provides a graphical presentation to the user of the multi-controller system 500 of FIG. 5A. The XML page 550 includes a listing 552a–552c for each controller 204a–204c present in the multi-controller system 500. The actual information displayed depends on the needs of the developer and can include, for example, controller ID, controller type, and other controller information as will be apparent to those skilled in the art.

The basic components of the XML page 550 can be stored in the embedded controller search software 502 of the polling BIOS 202. As the storage handling controllers 204a–204c of the multi-controller system 500 respond to the polling, the response information is used to complete construction of the XML page, which is then presented to the user using the embedded browser present in the option BIOS 202. In this manner a user can easily initialize and configure the individual controllers of the multi-controller system 500.

Figure 6:
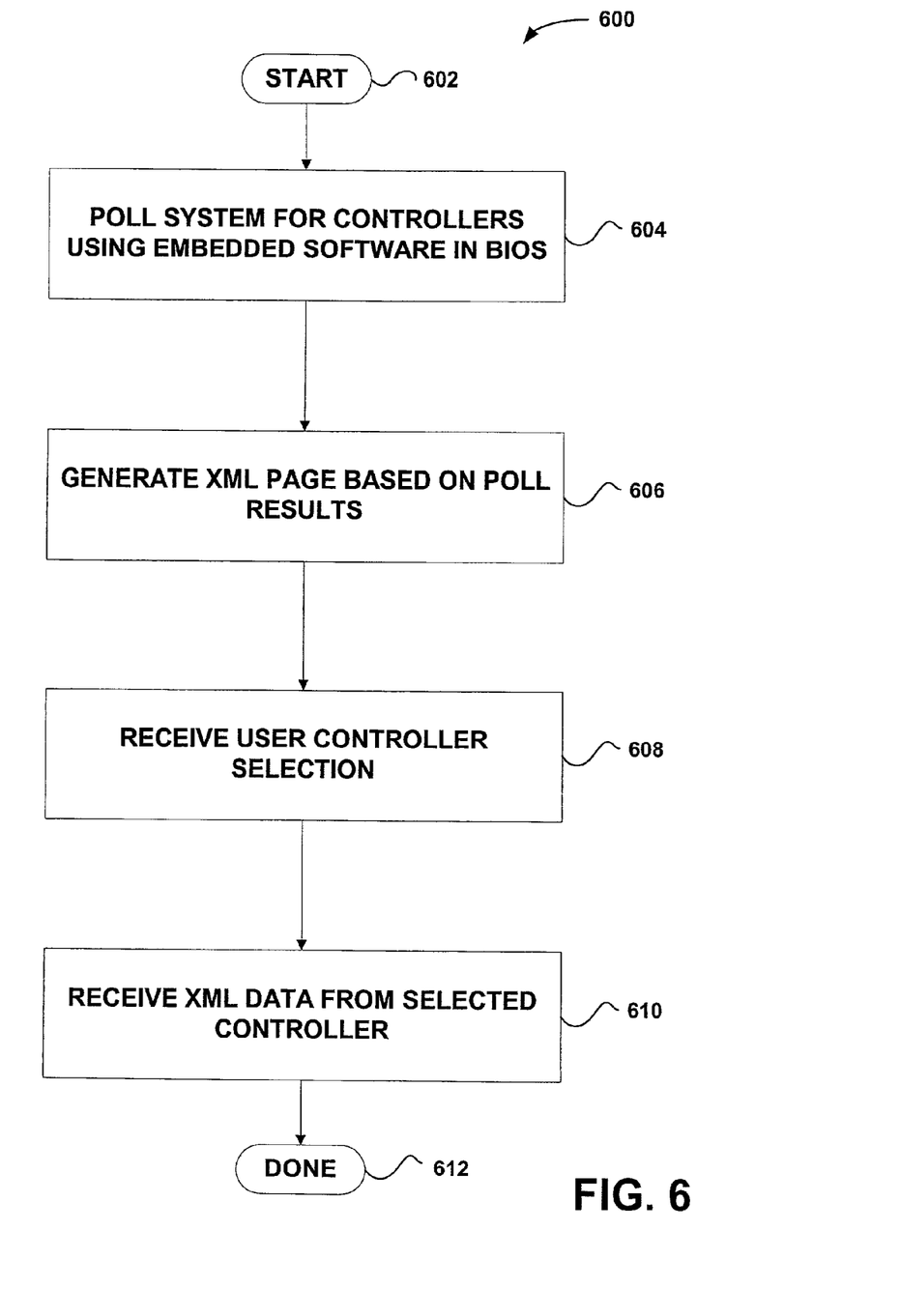
FIG. 6 is flowchart showing a method for initializing a multi-controller system, in accordance with an embodiment of the present invention.

FIG. 6 is flowchart showing a method 600 for initializing a multi-controller system, in accordance with an embodiment of the present invention. In an initial operation 602, preprocess operations are performed. Preprocess operations include provisioning the multi-controller system, and other preprocess operations that will be apparent to those skilled in the art.

In operation 604, the embedded controller search software polls the multi-controller system for storage handling controllers. As mentioned previously, the embedded controller search software is part of the option BIOS, which can be part of any of the storage handling controllers of the multi-controller system. However, generally the option BIOS of the first controller encountered in the system is selected. The selected option BIOS then executes its embedded controller search software to poll the remaining controllers in the multi-controller system.

The poll results are then used to generate a XML page, in operation 606. Upon receiving responses from the storage handling controllers of the multi-controller system, the embedded controller search software generates a XML page that includes the controller information for the multi-controller system. The XML page provides a graphical presentation to the user for the multi-controller system, and includes a listing for each controller present in the multi-controller system. As mentioned above, the actual information displayed depends on the needs of the developer and can include, for example, controller ID, controller type, and other controller information as will be apparent to those skilled in the art.

A user selection is then received, in operation 608. The generated XML page is presented to the user using the embedded browser provided in the option BIOS, as shown in FIG. 5B. Then, using the embedded browser, the user can select a particular storage handling controller to configure. In this manner a user can easily select individual controllers of the multi-controller system to initialize and configure. Upon receiving the selection, the embedded controller selection software requests configuration data from the selected storage handling controller.

In operation 610, XML data is received from the selected storage handling controller. As mentioned previously, the firmware of the storage handling controller is capable of generating and receiving XML data. Hence, in response to a configuration request, the firmware generates in XML data structures and provides the XML data structures to the option BIOS. The embedded browser provided in the option BIOS then is used to present the XML data to the user for configuration, as described above. Post process operations are then performed in operation 612. Post process operations include receiving configuration data from the user, configuring the controller, and other post process operations that will be apparent to those skilled in the art after a careful reading of the present specification. Advantageously, the XML capable firmware of the embodiments of the present invention allows the XML based storage handling controller to be configured remotely using an XML capable software, as described next with reference to FIG. 7.

Figure 7:
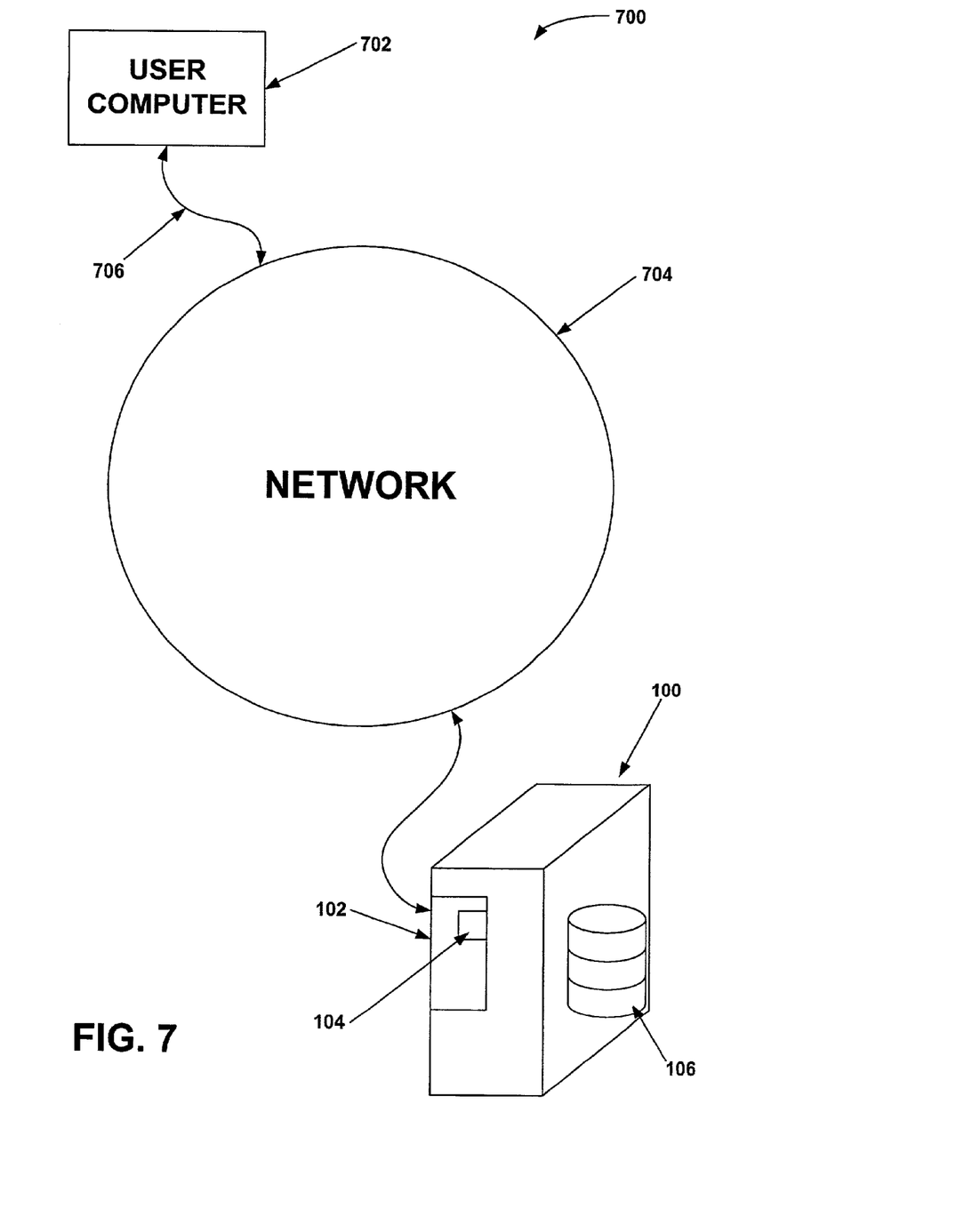
FIG. 7 is a diagram showing a XML based remote storage system, in accordance with an embodiment of the present invention.

FIG. 7 is a diagram showing a XML based remote storage system 700, in accordance with an embodiment of the present invention. The XML based remote storage system 700 includes a user computer 702 coupled to a network 704 via user connection 706. Also coupled to the network 704 is a RAID system 100 that includes a RAID card 102 having an XML based storage handling controller 104 coupled to a RAID drive 106. The network 704 can be a local area network (LAN), such as an Ethernet LAN, or a wide area network (WAN), such as the Internet. The user computer 702 can be any computer capable communicating over the network 704, such as a personal computer (PC) or a workstation.

In operation, the user computer 702 can utilize the RAID system 100 to store electronic information, such as computer data files. As mentioned above, The XML based storage handling controller 104 provides the functionality for the RAID drive 106, and improves performance and fault tolerance by disk striping, mirroring, and parity. As mentioned above, disk striping interleaves bytes or groups of bytes across multiple drives, so multiple disks read and write simultaneously. Mirroring duplicates 100% of the data on two drives, and parity calculates the data in two drives and stores the result on a third drive. Although, the storage-handling controller 104 has been described in terms of a RAID system, it should be noted that the embodiments of the present invention can be used for other storage handling based task, as will be apparent to those skilled in the art.

As mentioned above, unlike conventional controller firmware, which utilizes proprietary data structures for configuration operations, the firmware of the storage handling controller 104 of the embodiments of the present invention is capable of both receiving and generating XML data. The XML data structures provide greater flexibility than is possible using HTML, and provide greater flexibility in sharing in information on networks. In particular, XML provides enhanced flexibility in sharing in information on a storage area network.

The embodiments of the present invention provide remote storage handling controller configuration using XML data transmitted through the network 704. More specifically, the user computer 702 can use local configuration software, which can use a XML capable browser for a GUI, to generate XML based configuration commands. The generated XML data is then encapsulated by network software at the user computer 702, and transmitted through the network 704 to the RAID system 100. Network software present on the RAID system 100 removes the network headers, and provides the XML data to the storage handling controller 104.

Since the storage handling controller 104 of the embodiments of the present invention can generate, receive, and process XML data, no translation software is necessary. The storage handling controller 104 can receive the XML data directly, process the XML data, and respond to the user computer 702 using XML data. Upon generating configuration XML data, the storage handling controller 104 can provide the XML data to the network software executing on the RAID system 100. The network software then encapsulates the XML data and transmits the encapsulated XML data to the user computer 702 via the network 704.

In this manner, XML pages can be transmitted through a network, for example an IP based network, such as the Internet or an intranet. The XML provides a faster and more user friendly approach to controller configuration. Further, network users are currently beginning to use XML in much greater numbers than previously because of the greater flexibility and speed provided by XML. The popularity of XML has also caused an increase in the number of application programs utilizing XML, and this, in turn, has increased the number of users educated in XML.

Figure 8:
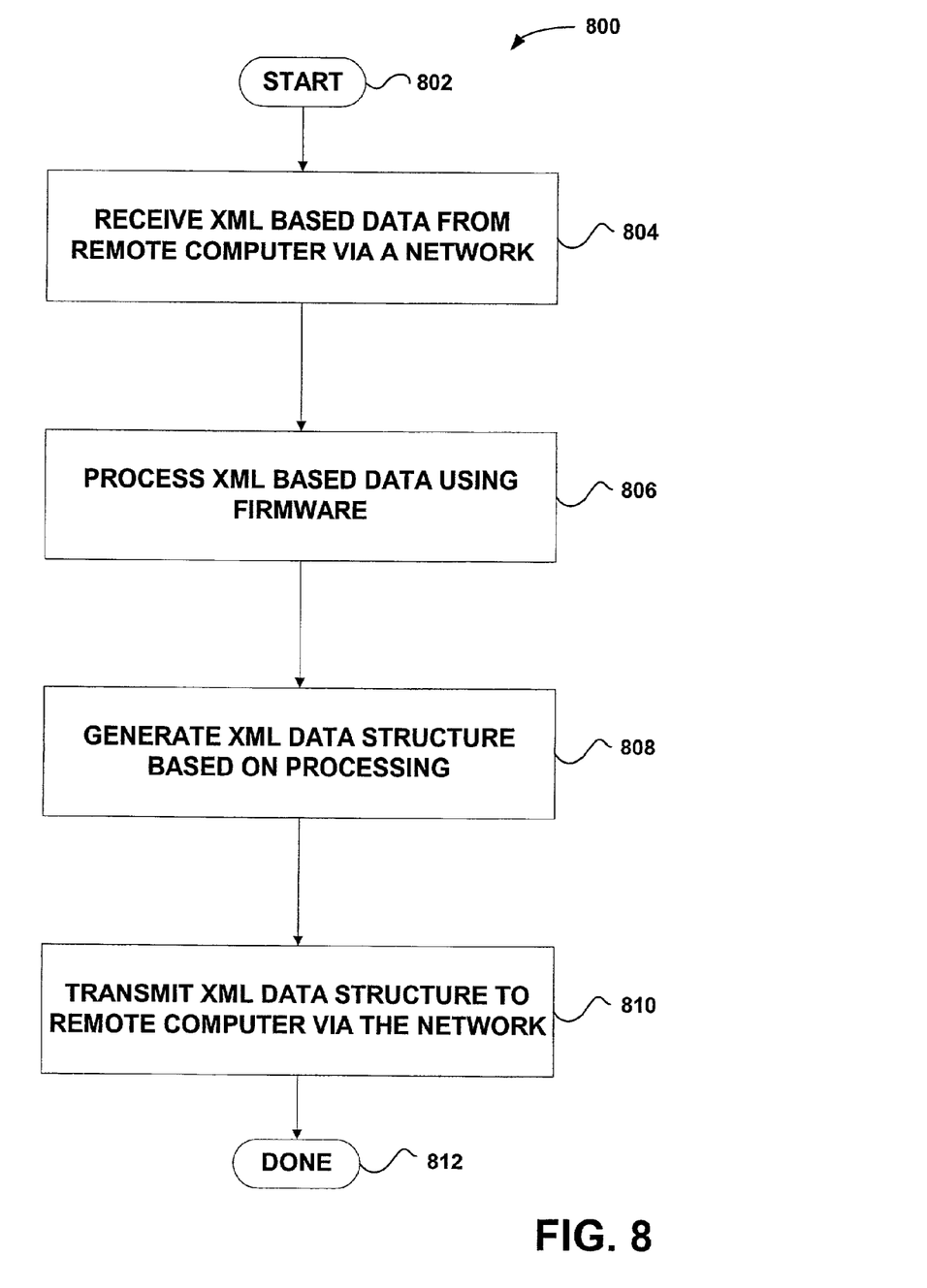
FIG. 8 is a flowchart showing a method for configuring a remote XML based storage handling controller, in accordance with an embodiment of the present invention.

FIG. 8 is a flowchart showing a method 800 for configuring a remote XML based storage handling controller, in accordance with an embodiment of the present invention. In an initial operation 802, preprocess operations are performed. Preprocess operations include initial configuration of the RAID system, enabling network communication between a remote user computer and the RAID system, and other preprocess operations that will be apparent to those skilled in the art.

In operation 804, XML based data is received from the remote user computer via the network. The remote user computer uses local configuration software, which can utilize a XML capable browser for a GUI, to generate the XML based data for controller configuration. The generated XML data is then encapsulated utilizing network software installed on the remote user computer, and then transmitted to the RAID system via the network. Network software present on the RAID system removes the network headers from the encapsulated XML data, and provides the XML data to the storage handling controller.

The received XML data is then processed using the firmware of the storage handling controller, in operation 806. As mentioned above, no translation software is necessary since the storage handling controller of the embodiments of the present invention can generate, receive, and process XML data. The storage handling controller therefore can receive the XML data directly and process the XML data.

After processing the XML data, the firmware generates XML data structures based on the XML processing, in operation 808. The firmware of the embodiments of the present invention communicates using data structures that are filled in depending on the state of the firmware and any data requests that are received by the firmware. Specifically, the firmware of the present invention communicates by filling in XML data structures based on the state of the firmware and any data requests that are received by the firmware.

In operation 810, the XML data structures are transmitted to the remote computer via the network. Upon generating the XML data structures, the storage handling controller can provide the XML data structures to the network software executing on the RAID system. The network software then encapsulates the XML data structures and transmits the encapsulated XML data structures to the remote user computer via the network. Post process operations are performed in operation 812. Post process operations include receiving the XML data structure at the user computer, removing the network headers, presenting the XML data structures to the user via a XML capable browser, and other post process operations that will be apparent to those skilled in the art. In this manner, the XML data structures can be transmitted back and forth between the remote user computer and the RAID system through the network and open system interconnection (OSI) software layers on the remote user computer and the RAID system.

Figure 9:
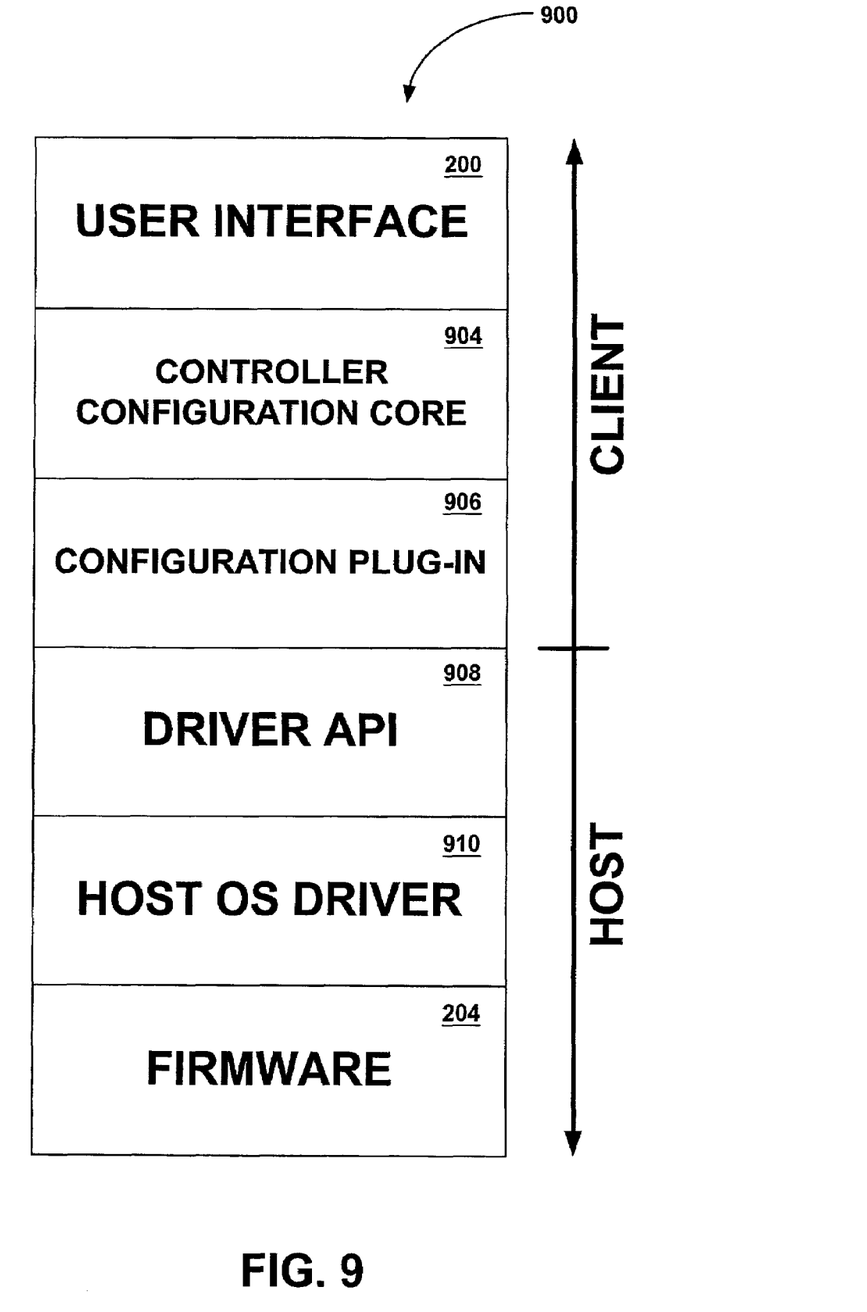
FIG. 9 is a block diagram showing the OSI software layers of a remote RAID storage system, in accordance with an embodiment of the present invention.

FIG. 9 is a block diagram showing the OSI software layers 900 of a remote RAID storage system, in accordance with an embodiment of the present invention. OSI is a standard for worldwide communications that defines a framework for implementing protocols in seven layers. Control is passed from one layer to the next, starting at the application layer in one station, proceeding to the bottom layer, over the channel to the next station and back up the hierarchy. Although most of the functionality in the OSI model exists in embodiments of the present invention, two or three OSI layers may be incorporated into one layer.

The OSI software layers 900 include a user interface 200, a controller configuration core 904, a configuration plug-in 906, a driver application program interface (API) 908, a host operating system driver 910, and firmware 204. The user interface 200, controller configuration core 904, and configuration plug-in 906 are located on the remote user computer, while the driver API 908, host operating system driver 910, and firmware 204 are located on the RAID system.

The user interface 200 generally comprises a XML capable browser that uses the XML data provided by the storage handling controller to create XML pages for display to the user. The controller configuration core 904 comprises the client side configuration logic for the storage handling controller. The controller configuration core 904 processes the XML data structures received from the storage handling controller and presents the results to the user via the user interface 200.

Communication with the storage handling controller software is facilitated by the configuration plug-in 906. The configuration plug-in 906 is designed to work in conjunction with the driver API 908 to communicate with the storage handling controller. The driver API 908 provides the program interface to the host operating system driver 910. Hence, the configuration plug-in 906 is capable of utilizing the method calls and program interface provided by the driver API 908 to communicate with the host operating system driver 910 executing on the RAID system. The host operating system driver 910 facilitates communication with the firmware 204 of the RAID system. Specifically, the host operating system driver 910 translates requests from the driver API 908 into hardware specific commands for the firmware 204. In addition, the host operating system driver 910 facilitates communication of the XML data to the firmware 204.

In operation, configuration XML data structures generated by the firmware 204 are passed to the host operating system driver 910, and then to the driver API 908. The driver API 908 then provides the XML data to the calling method of the configuration plug-in 906 via the network. The configuration plug-in 906, in turn, provides the XML data to the configuration core 904, which processes the XML data and presents the results to the user via the User interface 200. User selections and commands are then transmitted back to the firmware 204 in a similar manner, beginning with the user interface 200 and the configuration core 904. In this manner, the XML based storage handling controller of the embodiments of the present invention can be advantageously configured remotely using XML capable software.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An Extensible Markup Language (XML) based storage handling controller for a storage medium, comprising:
    a disk controller device providing functionality for a redundant array of independent disks (RAID);
    storage handling firmware embedded in the disk controller device, wherein the storage handling firmware is configured to generate XML based data containing data based on a state of the storage handling firmware, the storage handling firmware being configured to receive and process XML data containing configuration commands for the storage handling controller; and
    a basic input output system (BIOS) in communication with the storage handling firmware, the BIOS having an embedded browser capable of presenting the XML based data generated by the storage handling firmware.

2. An XML based storage handling controller as recited in claim 1, wherein the embedded browser provides a graphical user interface (GUI) configured to provide the configuration commands to the storage handling firmware.

3. An XML based storage handling controller as recited in claim 2, further comprising a Java Virtual Machine (JVM) that interfaces with the storage handling firmware.

4. An XML based storage handling controller as recited in claim 3, wherein the JVM is a compact JVM having a reduced feature set.

5. An XML based storage handling controller as recited in claim 1, wherein the BIOS is further capable of determining which other storage handling controllers are present in a multi-controller system.

6. An XML based storage handling controller as recited in claim 5, wherein the BIOS polls the multi-controller system to determine which other storage handling controllers are present in a multi-controller system.

7. A method for providing a configuration Extensible Markup Language (XML) page to a user for configuring an XML based storage handling controller, comprising the operations of:
    generating an XML based data structure using firmware for a storage handling controller, the storage handling controller being in control of one or more data storage drives, the XML based data structure containing data based on a state of the storage handling firmware;
    providing the XML based data structure to a basic input output system (BIOS) coupled to the storage handling controller; and
    displaying a user interface incorporating the XML based data structure using a browser embedded in the BIOS.

8. A method as recited in claim 7, wherein the embedded browser provides a graphical user interface (GUI).

9. A method as recited in claim 8, further comprising using the GUI to provide configuration commands to the storage handling firmware.

10. A method as recited in claim 9, wherein the one or more storage drives comprise a redundant array of independent disks (RAID) drive and the method further comprises operating the RAID drive using the configuration commands.

11. A method as recited in claim 7, further comprising an operation of determining which other storage handling controllers are present in a multi-controller system using the BIOS.

12. A method as recited in claim 10, wherein the BIOS polls the multi-controller system to determine which other storage handling controllers are present in a multi-controller system.

13. A method for initializing a multi-controller system having Extensible Markup Language (XML) based storage handling controllers, comprising the operations of:
    polling a multi-controller system to determine what storage handling controllers are present;
    generating an XML page based on a result of the polling;
    receiving a user selection of a storage handling controller in response to the XML page; and
    receiving XML based data from the selected storage handling controller, the XML based data containing data based on a state of the storage handling firmware.

14. A method as recited in claim 13, wherein the polling is performed by embedded controller search software included in a basic input output system (BIOS) of a multi-controller storage system.

15. A method as recited in claim 14, wherein the result of polling includes at least one response from a storage handling controller present in the multi-controller system.

16. A method as recited in claim 15, wherein the response includes information regarding the storage handling controller.

17. A method as recited in claim 16, wherein the XML page includes at least a portion of the information regarding the storage handling controller.

18. A method as recited in claim 13, wherein the XML page displays a plurality of storage handling controllers present in the system.

* * * * *